(12) United States Patent
Rietsch

(10) Patent No.: US 7,577,529 B2
(45) Date of Patent: Aug. 18, 2009

(54) METHOD FOR DETERMINING ATTRIBUTES ASSOCIATED WITH NET-SAND THICKNESS

(75) Inventor: Eike Rietsch, Houston, TX (US)

(73) Assignee: Chevron U.S.A. Inc., San Ramon, CA (US)

( * ) Notice: Subject to any disclaimer, the term of this patent is extended or adjusted under 35 U.S.C. 154(b) by 164 days.

(21) Appl. No.: 11/751,889

(22) Filed: May 22, 2007

(65) Prior Publication Data

US 2008/0294345 A1    Nov. 27, 2008

(51) Int. Cl.
    *G01V 1/00* (2006.01)
(52) U.S. Cl. ...................................... 702/14
(58) Field of Classification Search ............ 702/14, 702/17; 367/52, 73
    See application file for complete search history.

(56) References Cited

U.S. PATENT DOCUMENTS 5,982,706 A * 11/1999 Byun .......................... 367/52
6,751,559 B2 * 6/2004 Fookes et al. ................ 702/17
7,088,639 B2 * 8/2006 Walls et al. .................. 367/73

OTHER PUBLICATIONS

Hart et al., Understanding Seismic Attributes Through Forward Modeling, The Leading Edge, Sep. 2004, pp. 834-841.
Walker et al., Seismic Multi-Attribute Analysis for Lithology Discrimination in Ganso Field, Oficina Formation, Venezuela, The Leading Edge, Nov. 2005, pp. 1160-1166.
Hill et al., Sand Thickness Prediction from 3-D Seismic Data: A Case Study of the Upper Jurassic Frisco City Sand of Southwest Alabama, The Leading Edge, Sep. 2001, pp. 950-964.
Kalkomey, Potential Risks When Using Seismic Attributes as Predictors of Reservoir Properties, The Leading Edge, Mar. 1997, pp. 247-251.
Herrera et al., Neural Networks in Reservoir Characterization, The Leading Edge, Apr. 2006, pp. 402-411.
Brown, Pitfalls in 3D Seismic Interpretation, The Leading Edge, Jul. 2005, pp. 716-717.

* cited by examiner

*Primary Examiner*—Tung S Lau
*Assistant Examiner*—Xiuquin Sun
(74) *Attorney, Agent, or Firm*—Torrey A. Pennebaker

(57) ABSTRACT

The present invention provides a method for determining net-sand thickness and net-reservoir volume over a broad range of gross sand thickness in a target zone. A net-resource attribute is designed to estimate net-sand thickness based upon the inner product of the determined probe function and the segment of the seismic trace that includes the target zone. The net-resource attribute and the geographic location for each trace can be stored and a net-resource table may be created. Maps and net-reservoir volume can be generated from the geographical location information and the net-resource attributes. Net-sand thickness allows the determination of the total volume of sand and thus the size of the hydrocarbon container or the net-reservoir volume.

17 Claims, 9 Drawing Sheets

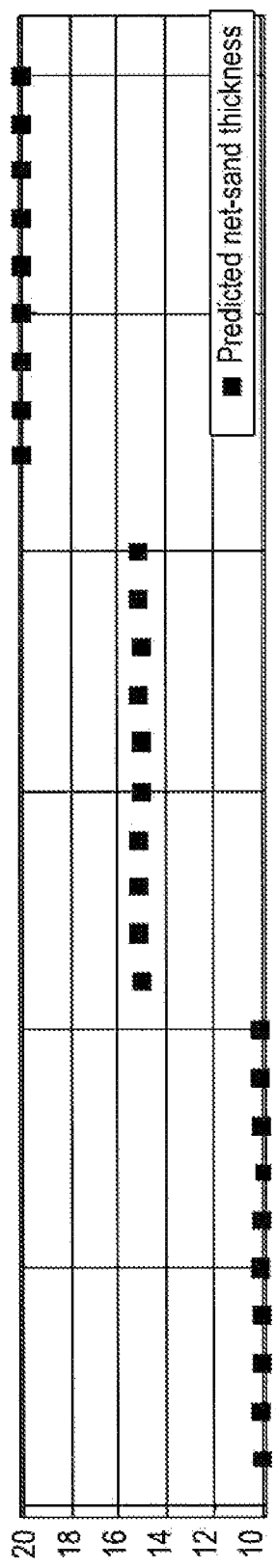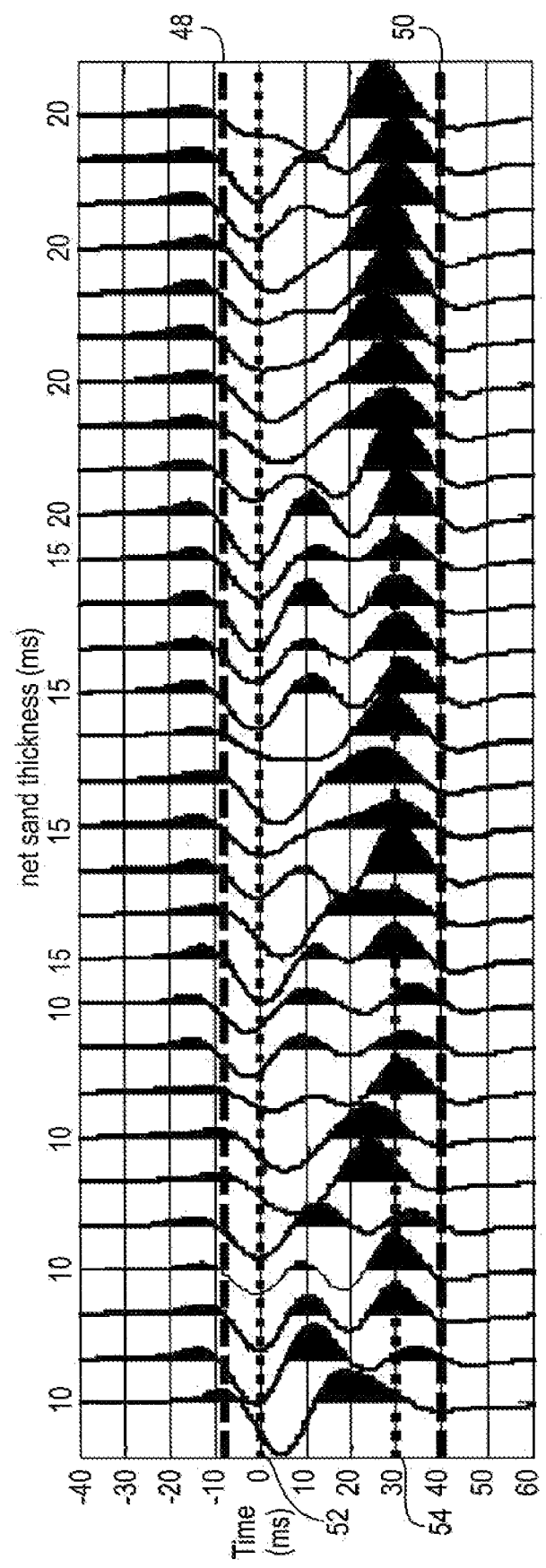
FIG. 6

METHOD FOR DETERMINING ATTRIBUTES ASSOCIATED WITH NET-SAND THICKNESS

TECHNICAL FIELD

The present invention relates generally to seismic exploration, and more particularly to determining net-sand thickness in a subterranean region.

BACKGROUND OF THE INVENTION

In the on-going search for subsurface hydrocarbons, methods have been developed for evaluating and interpreting the structure and characteristics of the earth's subsurface. The ability to accurately determine the volume of hydrocarbons present in subsurface reservoirs is particularly important.

The importance of such an ability is mostly driven by economic realities: if reservoirs can be defined more accurately, then better decisions can be made leading to higher drilling success and fewer development wells. The size of a reservoir and the total volume of hydrocarbons in place are critical for the decision to develop a field, estimating the terms of delivery, and designing the surface facilities. Under-designed facilities do not allow hydrocarbon extraction at optimal rates and overdesign adds unnecessary expenses.

For hydrocarbons to accumulate in the subsurface, both reservoir rocks and sealing rocks are needed. Reservoir rocks of high enough porosity are necessary to hold a sufficient quantity of hydrocarbons in their pore space. Impermeable sealing rocks are necessary to keep the hydrocarbons in place and prevent the hydrocarbons escaping to the surface. Various types of reservoir rocks can serve as reservoirs for hydrocarbons. Sandstones, also sands, are the most common. Seals are frequently provided by shales. Sand reservoirs do not usually consist of one thick slab of sand but rather of a number of sands separated by shales. The aggregate of sands and interbedded shales, the sand/shale package, is known in the industry as gross sand. The gross sand has a top and a base which are usually mapped on the basis of seismic data and, if available, well data. While it would be highly desirable to be able to map individual sands within the gross sand, the resolution of seismic data, in general, is not nearly high enough to make this possible. It is a more realistic objective, based on current technology, to map the total cummulative thickness of all the sands, the net-sand thickness, in the gross sand. This net-sand thickness, if known over the whole lateral extent of the gross sand, allows one to determine the total volume of sand and thus the size of the hydrocarbon container or the net-reservoir volume.

Accurately predicting the gross sand thickness variations of a reservoir and the net-sand thickness is essential for estimating the amount of hydorcarbon in place. Knowledge of the net-sand thickness as a function of location also allows one to properly place additional wells to optimally drain a reservoir.

The evaluation of reservoirs is typically achieved using a combination of seismic and well data. However, well data obtained from well logs of various types represent data samples from only a small fraction of a reservoir's volume surrounding a well. Three-dimensional seismic surveys provide seismic data samples over most of a reservoir's volume, including portions not sampled by wells. At best, however, the seismic data can provide only highly averaged information. Various methods have been tried to estimate the net-sand thickness from well data and seismic data. These methods usually rely on the fact that, particularly for large reflection angles, reflections from sand/shale interfaces are stronger than interfaces between different types of shale. Typical practice is to use a combination of well data and seismic data to predict the composition of reservoir rocks and lithology.

A recent approach involves generating one or more seismic attributes that are linked or physically related to the reservoir properties of interest. A seismic attribute is derived from a seismic trace. A seismic attribute is a quantitative derivative of a basic seismic measurement that may be extracted along a seismic trace, extracted along a horizon, or summed over a time window. Examples of seismic attributes are the peak amplitude of a seismic trace within a time window and the average magnitude of a seismic trace within a time window. The methodology involved in using seismic-guided estimates to characterize reservoir properties requires that the seismic data be reliably linked with the well data, both vertically and horizontally, correctly correlating seismic attributes to the reservoir properties of interest, and extrapolating the properties throughput the seismic volume.

Current methods are limited by the lack of a reliable physical relationship between the seismic attributes used and the geologic property of interest such as the net-sand thickness, arid are therefore prone to spurious correlations and results. Prior to the present invention, there was no existing methodology to directly measure net-sand thickness over a broad range of gross sand thicknesses. The contribution of the present invention resides in the discovery of a new method which directly determines net-sand thickness and net-reservoir volume over a broad range of gross sand thicknesses.

SUMMARY OF THE INVENTION

The present invention overcomes the above-described and other shortcomings of the prior art by providing a novel and improved method of determining net-sand thickness and net-reservoir volume over a broad range of gross sand thickness in a target zone. It is accomplished by determining a net-resource attribute designed to estimate net-sand thickness based on probe functions that are computed from the seismic signals from the target zone.

One embodiment of the present invention includes a method for determining net-resource attributes associated with the net-sand thickness in a target zone, which includes: obtaining a plurality of seismic traces from a seismic survey conducted over a subterranean region; obtaining a top and a base of a target zone for each seismic trace; determining a gross thickness for each seismic trace by subtracting the top from the base of the target zone; determining a probe function associated with the gross thickness of each seismic trace; and computing a net-resource attribute based upon the inner product of the determined probe function and the segment of the seismic trace that includes the target zone. Optionally, a seismic wavelet for the target zone can be estimated and the probe function can be calculated based upon the seismic wavelet.

In one embodiment of the present invention a plurality of bins are defined based upon the gross thicknesses derived from all of the seismic traces. Probe functions for each bin are determined, computed and assigned to each seismic trace based upon the bin into which the gross thickness for that seismic trace falls.

In another embodiment of the present invention, the application of the probe function is such that the projection of the seismic trace segment on to the probe function provides a net-resource attribute and the net-resource attribute is the net-sand thickness of the target zone.

It is an object of the present invention to store the net-resource attribute together with the geographic location information. A net-resource table may be created to capture the geographical location information and the associated net-resource attribute. Maps and net-reservoir volume can be generated from the geographical location information and the net-resource attributes, and can also be generated from the net-resource tables.

It should also be appreciated that the present invention is typically carried out using a data management system which includes, in general, at least one data processor, at least one memory device for storing program data, at least one data display device and at least one input device. The data processor is preferably a microprocessor or microcontroller-based platform which is capable of processing complex mathematical algorithms. The memory device can include random access memory (RAM) for storing data generated or used during a particular process associated with the present invention. The memory device can also include read-only memory (ROM) for storing the program code for the controls and processes of the present invention. The display devise can be a monitor, for example a liquid crystal display.

Additional features and advantages of the present invention are described in, and will be apparent from, the following Detailed Description of the Invention and the Figures.

BRIEF DESCRIPTION OF THE DRAWINGS

These and other objects, features and advantages of the present invention will become better understood with regard to the following description, pending claims and accompanying drawings as follows:

FIG. 6 is a schematic showing the synthetic seismic traces corresponding to the pseudo-wells of FIG. 5, computed with a zero-phase 5-10-30-60 Hz Ormsby wavelet. Also shown is the predicted net-sand thickness in ms traveltime computed with a probe function with 8 ms top overhang and base overhang.

DETAILED DESCRIPTION OF THE INVENTION

Figure 1:
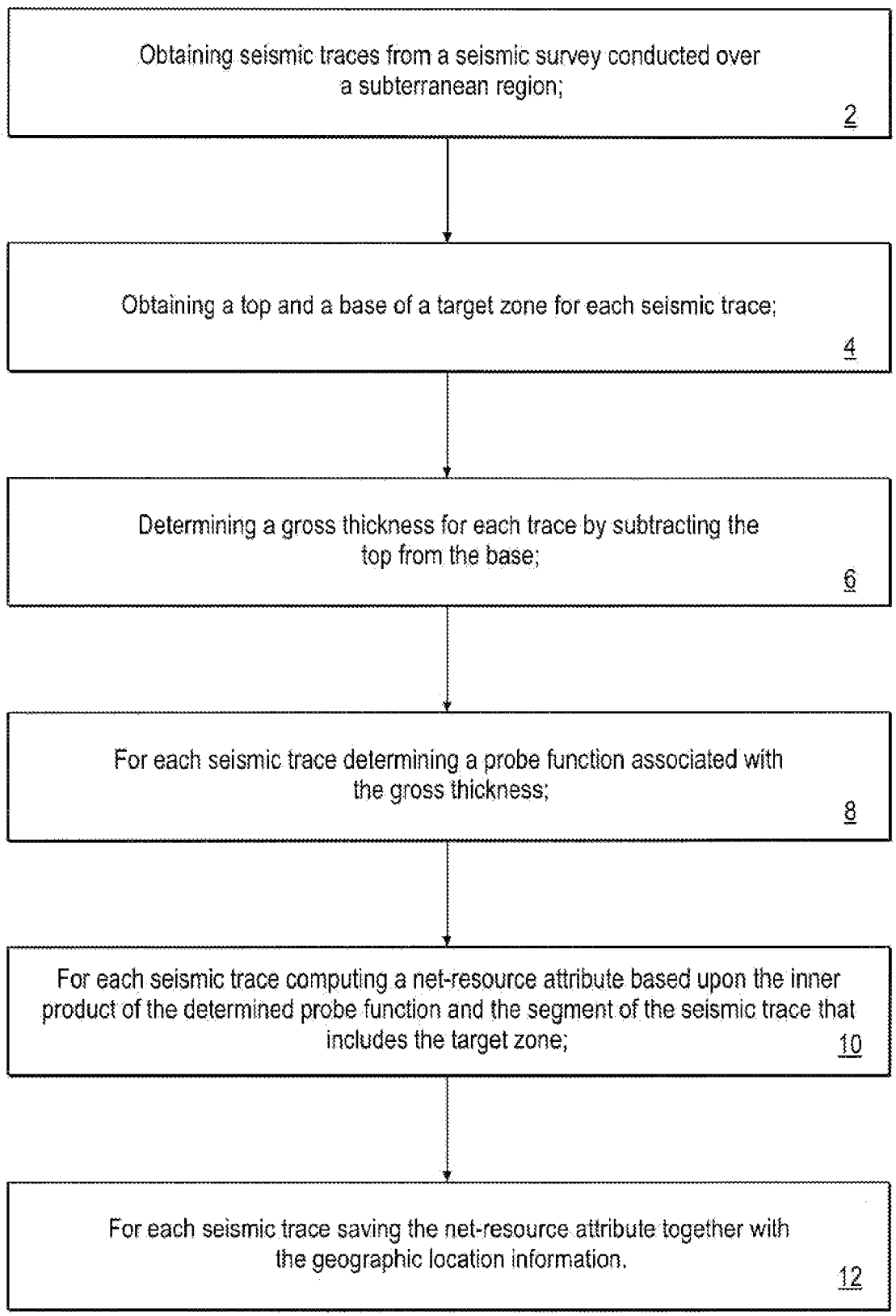
FIG. 1 is a flowchart of one embodiment of the present invention illustrating a method for directly determining net-resource attributes associated with the net-sand thickness of a target zone.

This invention may be practiced in any one of many different embodiments, they are as shown in the drawings, and as will herein be described in detail. Accordingly, the present disclosure is an exemplification of the principles of the invention and a description of the means to carry out the invention, and is not intended to limit the broad aspects of the invention to the illustrated embodiments.

Certain terms are defined throughout this description as they are first used, while certain other terms used in this description are defined below:

"Attribute" shall mean a quantitative derivative of a basic seismic measurement that may be extracted along a seismic trace, extracted along a horizon, or summed over a time window.

"Gross sand" or "gross thickness" or "target thickness" shall mean the total cummulative thickness of all of the sands and interbedded shales between the top and base of a target zone.

"Inner Product", the inner product of two functions is a number that can be computed by multiplying the two functions and integrating the product.

"Net-resource attribute" shall mean an attribute associated with the net-sand thickness, and may include the net-thickness of hydrocarbon sands, aquifers or coal beds.

"Net-reservoir volume" shall mean the total volume of sand over the entire lateral extent of the reservoir.

"Net-sand thickness" shall mean the total cummulative thickness of all the sands in the gross sand, and may include the thickness of other formations such as coal beds.

"Probe function" is a short signal that is defined over an interval, the length of which is equal to or greater than the thickness of the target zone. A probe function is used to extract information from a seismic trace segment with reflections from the target zone by computing the inner product of the probe function and that segment.

"Reservoir rocks" shall mean reservoir quality rocks with high enough porosity to hold sufficient quantities of hydrocarbons in the pore space.

"Sands" shall mean sandstone reservoir rocks.

"Seals" shall mean impermeable rocks that keep hydrocarbons in place and prevent them from escaping to the surface, for example shales.

"Target zone" shall mean the zone of interest in a subterranean region.

The method utilized in one embodiment of the present invention is illustrated in FIG. 1. This embodiment comprises six steps, shown individually. More specifically, this embodiment directly determines net-resource attributes associated with the net-sand thickness over a broad range of gross sand thickness in the target zone. Seismic traces are obtained from a seismic survey conducted over the subterranean region 2. A top and a base of the target zone for each seismic trace are then obtained 4. A gross thickness for each trace is determined by subtracting the top from the base 6, and a probe function associated with the gross thickness is determined for each seismic trace 8. A net-resource attribute is computed based upon the inner product of the determined probe function and the segment of the seismic trace that includes the target zone 10. The net-resource attribute together with the geographic location information for each seismic trace can then be saved 12.

Figure 2:
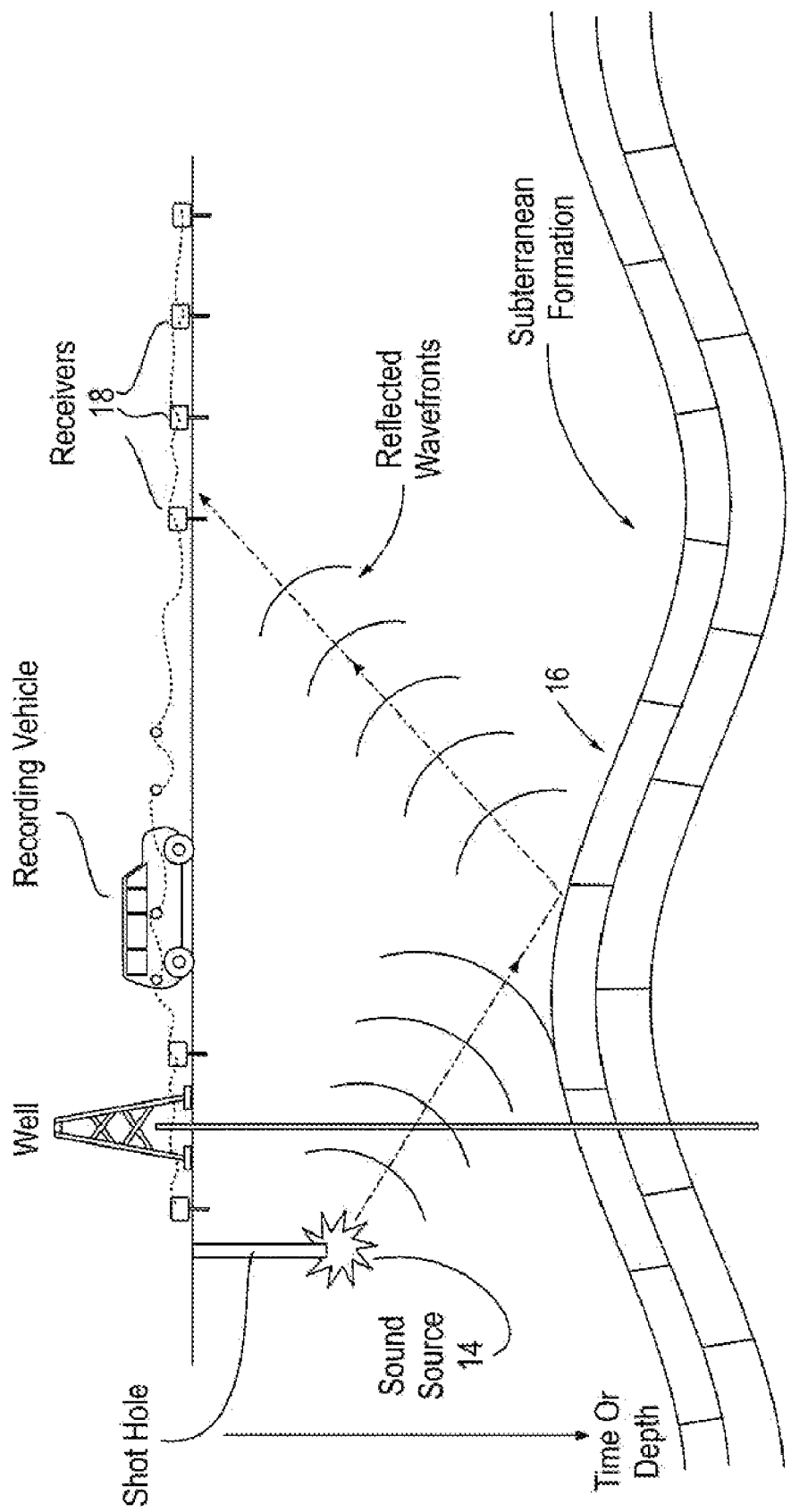
FIG. 2 is a schematic drawing of a seismic survey method with seismic data being obtained from a subterranean region which is believed to contain a commercially viable quantity of hydrocarbons.

The above-embodiment of the present invention includes obtaining seismic traces from a seismic survey conducted over a subterranean region 2. FIG. 2 depicts typical features of a seismic survey over a subterranean formation. Seismic waves are created near the surface, by a sound source 14. These waves travel into the earth and are reflected at interfaces 16 between different rock strata. The reflected waves are recorded by detectors 18 usually near or on the surface. These recordings are processed using data processing methods known in the art to create a volume of seismic data. The volume of seismic data is an assembly of individual seismic traces, each tied to surface locations on a regular grid. In seismic exploration for hydorcarbons one is usually not interested in the entire subsurface but in a target zone which geologists have identified as having a high probability for hydrodarbons, or other fluids of interest.

Figure 3:
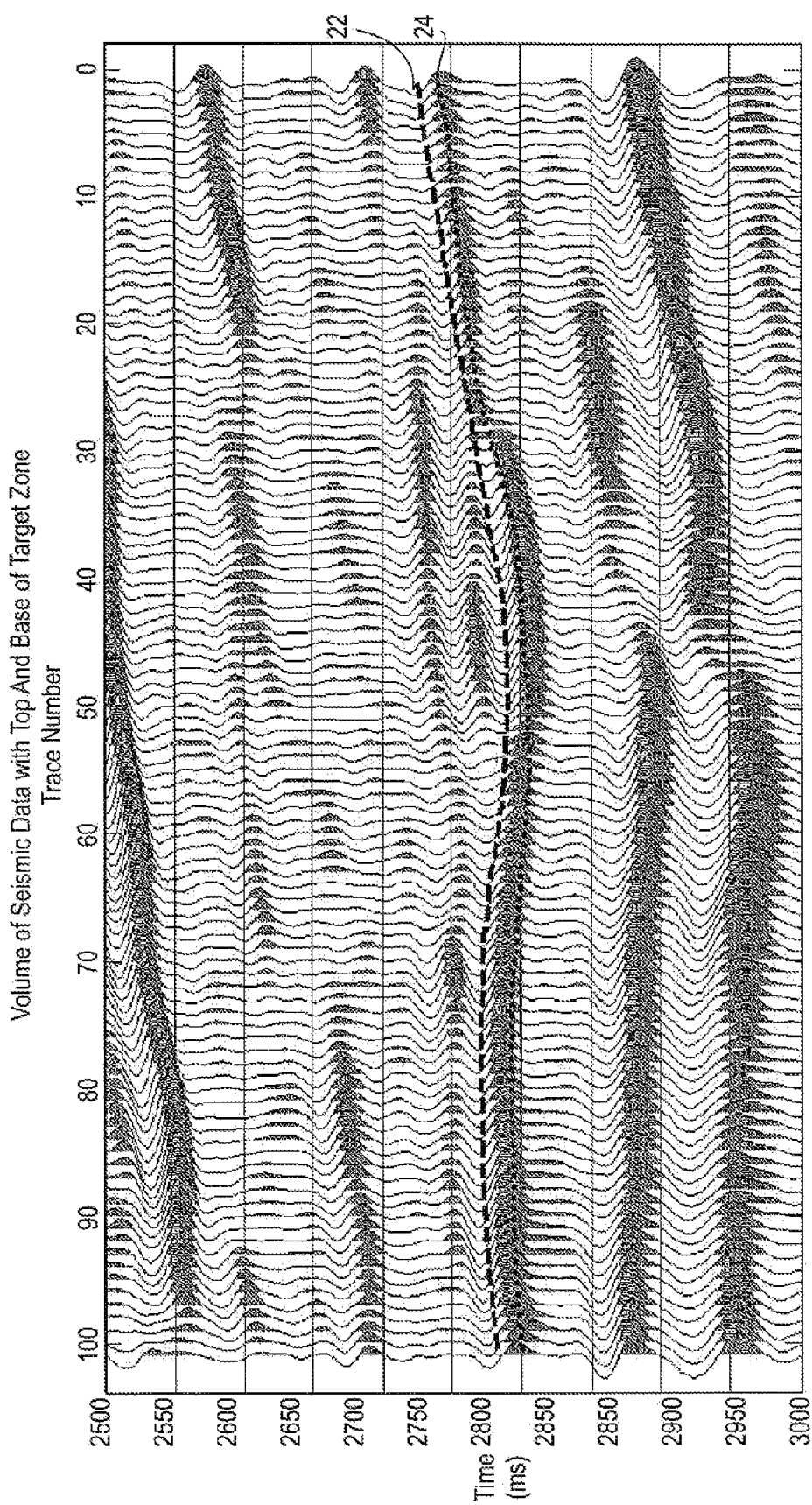
FIG. 3 is a cross-section of a volume of seismic data, showing the top and base of a target zone as picked by an interpreter.

This embodiment of the present invention includes obtaining a top and a base of a target zone for each seismic trace 4. The target zone is defined by a top and a base that can vary from one trace to the other. FIG. 3 is a cross-section of a volume of seismic data 20, showing the top 22 and base 24 picks of a target zone, plotted over seismic traces, as typically performed by an interpreter using a data management system capable of seismic interpretation.

Additionally, this embodiment of the present invention includes determining the gross thickness for each trace by subtracting the top of the target zone from the base of the target zone 6. Gross thickness is typically generated using commercially available software such as SeisWorks™ available from Landmark of Houston, Tex., or GeoQuest™ available from Schlumberger of Houston, Tex.

Optionally, the probe function utilized by the present invention can be based upon an estimated seismic signal, generally the seismic wavelet, for the target zone. Numerous software tools are known in the art and are commercially available such as those from Fugro-Jason and Hampson-Russell. If a well log is available then the wavelet is computed by matching reflection coefficients from the well log to the seismic traces at the well location. Alternatively, when well log data is not available, a number of approaches may be used to compute the seismic wavelet using, for example, higher-order statistics.

For each seismic trace, this embodiment of the present invention determines a probe function associated with the gross thickness 8. The probe function is designed to cooperate with the seismic trace segment to provide an estimate of a scalar net-resource attribute. The term probe function or, simply, "probe" is used to denote a short signal that is defined over an interval, the length of which is equal to or greater than the thickness of the target zone. A probe function can be a linear function with zero mean. In one embodiment of the present invention, the attribute designed to estimate net-sand thickness is based on probe functions that are computed from the seismic signal, the wavelet. A probe function is used to extract information from a seismic trace segments with reflections from the target zone by computing the inner product of the probe function and that segment.

In other embodiments of the present invention, the gross thicknesses for all the seismic traces are grouped. Such groups are typically referred to as bins. For example, the range of gross thicknesses from the seismic traces may range from a minimum of 4 ms to 60 ms. In this case, the bins may be defined as having widths of 4 ms with bin edges at 4, 8, 12, ... 60 ms. In this way probe functions may he determined for groups of traces rather than for each individual trace. Thus for each of these defined bins a probe function is determined. Each seismic trace is assigned a probe function based upon the bin into which the gross thickness for that seismic trace falls.

Figure 4:
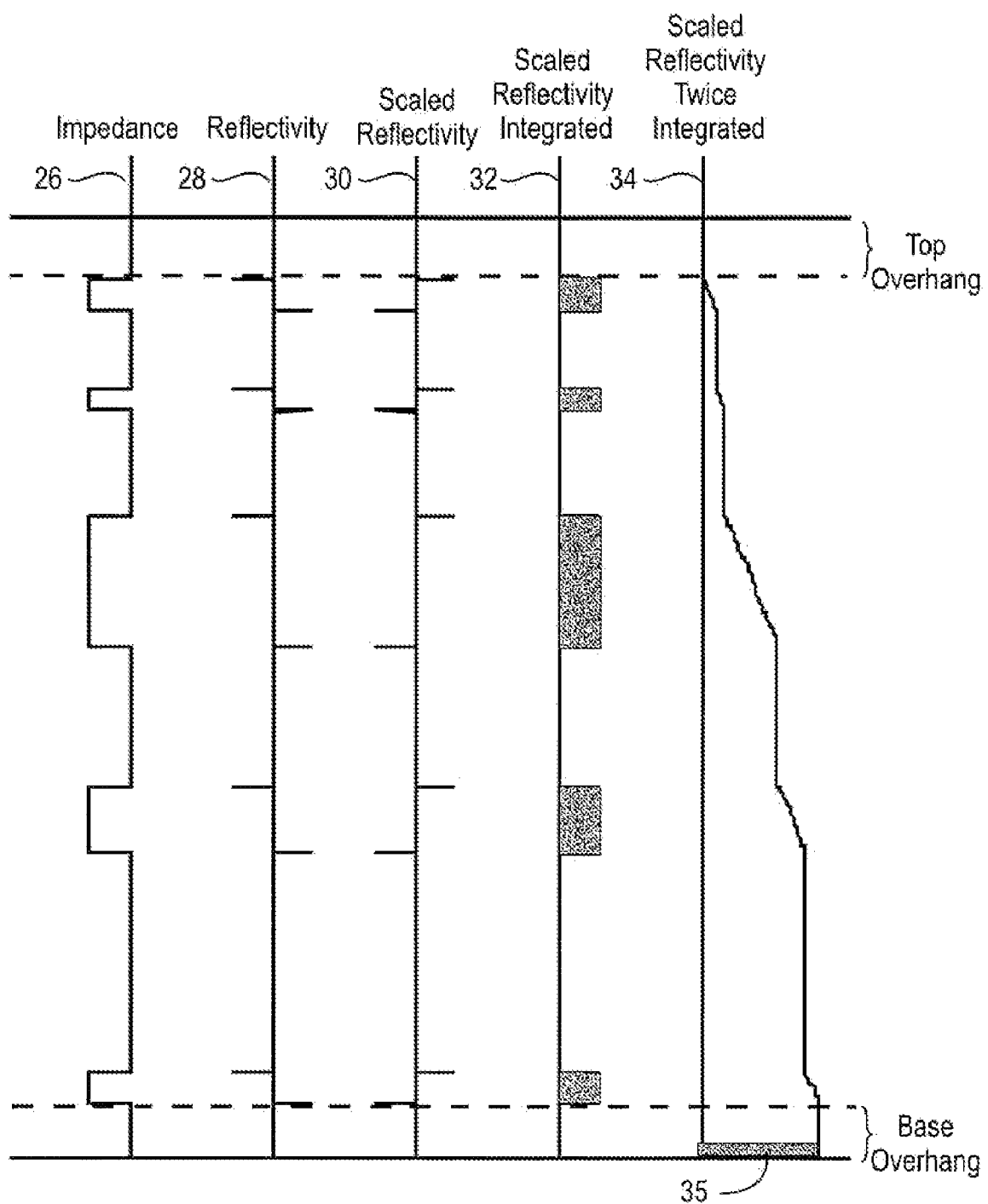
FIG. 4 is a schematic drawing explaining the seismic basis for the present invention.

FIG. 4 is a schematic drawing showing the seismic basis for the present invention. The first graph, labeled "Impedance" 26 shows the acoustic or elastic impedance of a sequence of shale and sand layers as a function of depth expressed in terms of travel time. The sand layers are represented by the rectangular deflections to the left. Frequently, sands have lower impedance than shales. The second graph, labeled "Reflectivity" 28 shows the reflections that would be generated by the sequence of shale and sand layers. The third graph 30 is a scaled copy of the second graph with a scale factor chosen so that the top reflection coefficient is positive and has amplitude 1. Thus the scale factor is the reciprocal of the reflection coefficient at the shale/sand boundary and the spikes in this graph have amplitudes +1 or −1. The fourth graph 32 represents the integral over the scaled reflection coefficients, since the scaled reflection coefficients are +1 and −1, respectively. Their separation is the sand thickness, the area defined by the black boxes. Another integration leads to the fifth graph 34 which is the total area of the boxes on the preceding graph as a function of depth (in terms of travel time). Thus, the net-sand thickness is represented by the final value of the curve; as represented by the thick horizontal bar 35.

A seismic trace with an impulse as the seismic signal represents the most basic model. In this case the seismic trace is simply a scaled version of the reflection coefficients. On the basis of FIG. 4, the net-sand thickness for this case is the weighted integral of the reflection coefficient series.

$$N = \int_0^T p_0(t)r(t)dt \tag{1}$$

where $$p_0(t)=c(t-T/2) \text{ for } 0 \leq t \leq T \tag{2}$$

p(t) is the desired probe function; and $p_0(t)$ is a probe function for the seismic trace r(t) when the wavelet is a spike. Here c is the reciprocal of the shale/sand reflection coefficient. The top of the target zone is arbitrarily associated with time 0 and its base with time T. The thickness of the target zone is T. Equation (1) shows that the net-sand thickness N is essentially the inner product of the probe function $p_0(t)$ with the seismic trace r(t) consisting of reflection coefficients. The inner product of two vectors is computed by multiplying corresponding components of the two vectors and then summing the products.

The concept of a probe function for an impulsive signal can be generalized for application to seismic data when the wavelet is not an impulse. In this case the seismic data can be represented as:

$$s(t) = \int_0^T w(t-\tau)r(\tau)d\tau \tag{3}$$

where T is the thickness of the target zone. To reduce the number of parameters the target zone is assumed to start at time 0. In this case the net-sand thickness N is given by:

$$N = \int_{T_1}^{T_2} p(t)s(t)dt \tag{4}$$

here $$T_1 \leq 0; T_2 \geq T. \tag{5}$$

Figure 7:
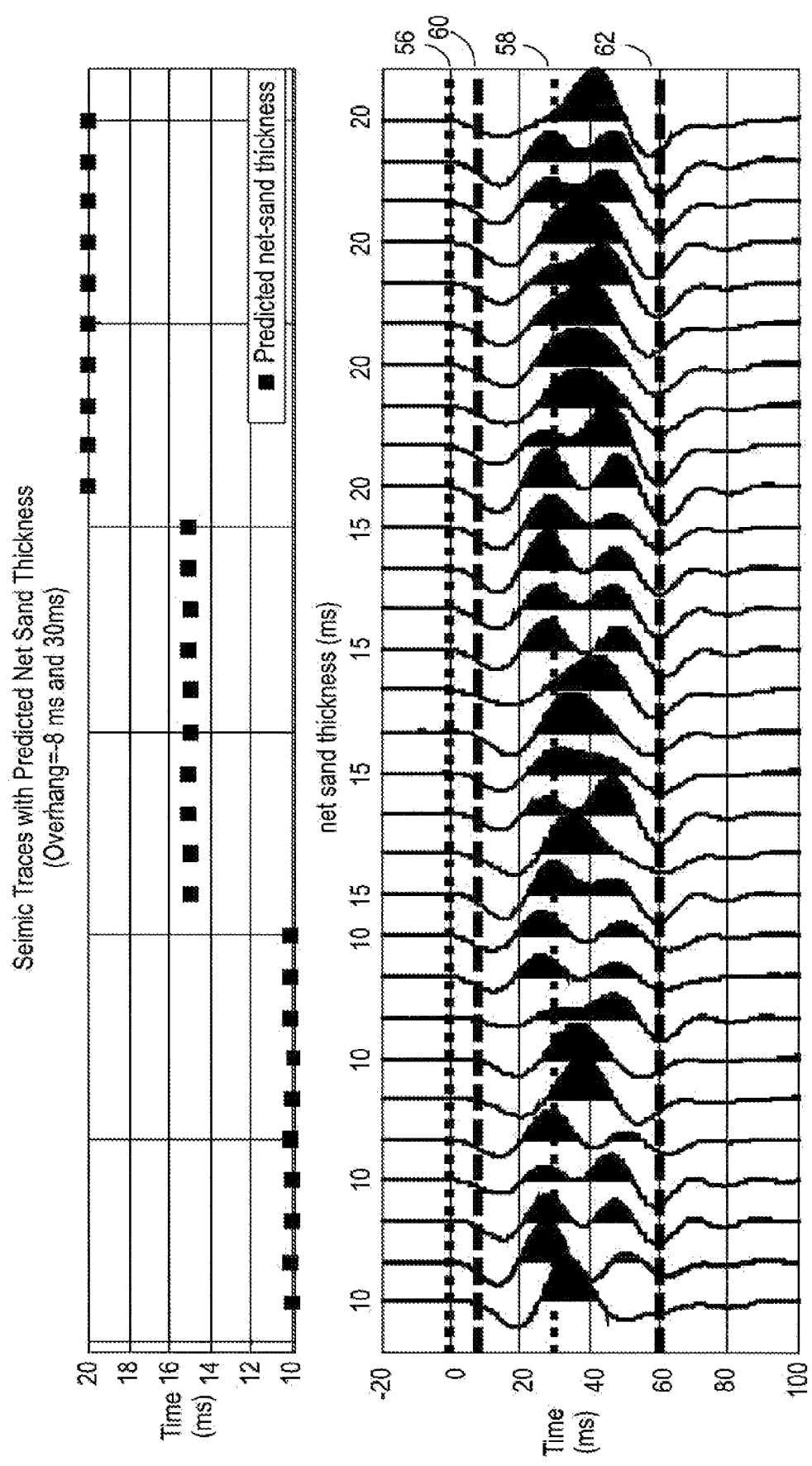
FIG. 7 is a schematic showing the synthetic seismic traces corresponding to the pseudo-wells of FIG. 5, computed with a minimum-phase 5-10-30-60 Hz Ormsby wavelet. Also shown is the predicted net-sand thickness in ms traveltime computed with a probe function with −8 ms top overhang and 30 ms base overhang.

The time $-T_t$ is top overhang, the time $T_2-T$ is base overhang. Overhangs represent the time by which a probe function deviates from the target zone. For symmetric wavelets the amount of top overhang and base overhang are preferably the same. For non-symmetric wavelets they may be quite different as shown in FIG. 7. In FIG. 7 the top overhang 56-60 is −8 ms and the base overhang 58-62 is 30 ms in order better to capture the signal generated by the reflections from the reservoir zone.

One embodiment of the present invention uses the following equation to calculate the probe function:

$$\int_{T_1}^{T_2} \omega(\tau - t) p(\tau) d\tau = p_0(t). \quad (6)$$

One skilled in the art will appreciate that the probe function $p(t)$ in the above equation will depend on the wavelet $w(t)$. Equation (6) is an inhomogeneous Fredholm integral equation of the first kind. For digital seismic data this integral equation can be converted into a linear system of equations with an exactly known right-hand side (the sampled function $p_0(t)$ defined in equation (2)) for the samples of $p(t)$ (here denoted as $p_k$).

Let $w_j$ denote the samples of the wavelet with $w_o$ being the sample associate with zero-time and $\Delta t$ the sample interval. Then the vector of samples $p_k$ of the probe function is the solution of the linear system of equations:

$$\sum_{k=K_1}^{K_2} w_{k-j} p_k = p_{0,j} \quad (7)$$

where $K_1 = T_1/\Delta t$; $K_2 = T_2/\Delta t$; and $p_{0,k} = c[k - T/(2\Delta t)]$ for $k = 0, \ldots, T/\Delta t$. (8)

There is nothing in the equation that requires a specific wavelet shape. Hence, the actual shape of the wavelet does not matter; the result is true for wavelets of any shape such as, for example, minimum-phase wavelets as show in FIG. 7.

The embodiment illustrated in FIG. 1 includes for each seismic trace a net-resource attribute is computed based upon the determined probe function and the segment of the seismic trace that includes the target zone 10. In one embodiment of the present invention, the inner product of the probe function and the corresponding segment of the seismic trace are computed to arrive at a net-resource attribute. The net-resource attribute can also be viewed as the weighted sum of seismic samples in a time window that includes the top and the base of a gross sand, picked by an interpreter. A weighted sum as mentioned above is a sum where each seismic sample is multiplied by a specific weight, that usually changes from sample to sample, and then the products are added together. The weights are the samples of the probe function; in mathematical terms, the weighed sum is the inner product between the seismic samples of the target zone and the samples of the probe function. Properly scaled, this net-resource attribute is the net-sand thickness.

Figure 5:
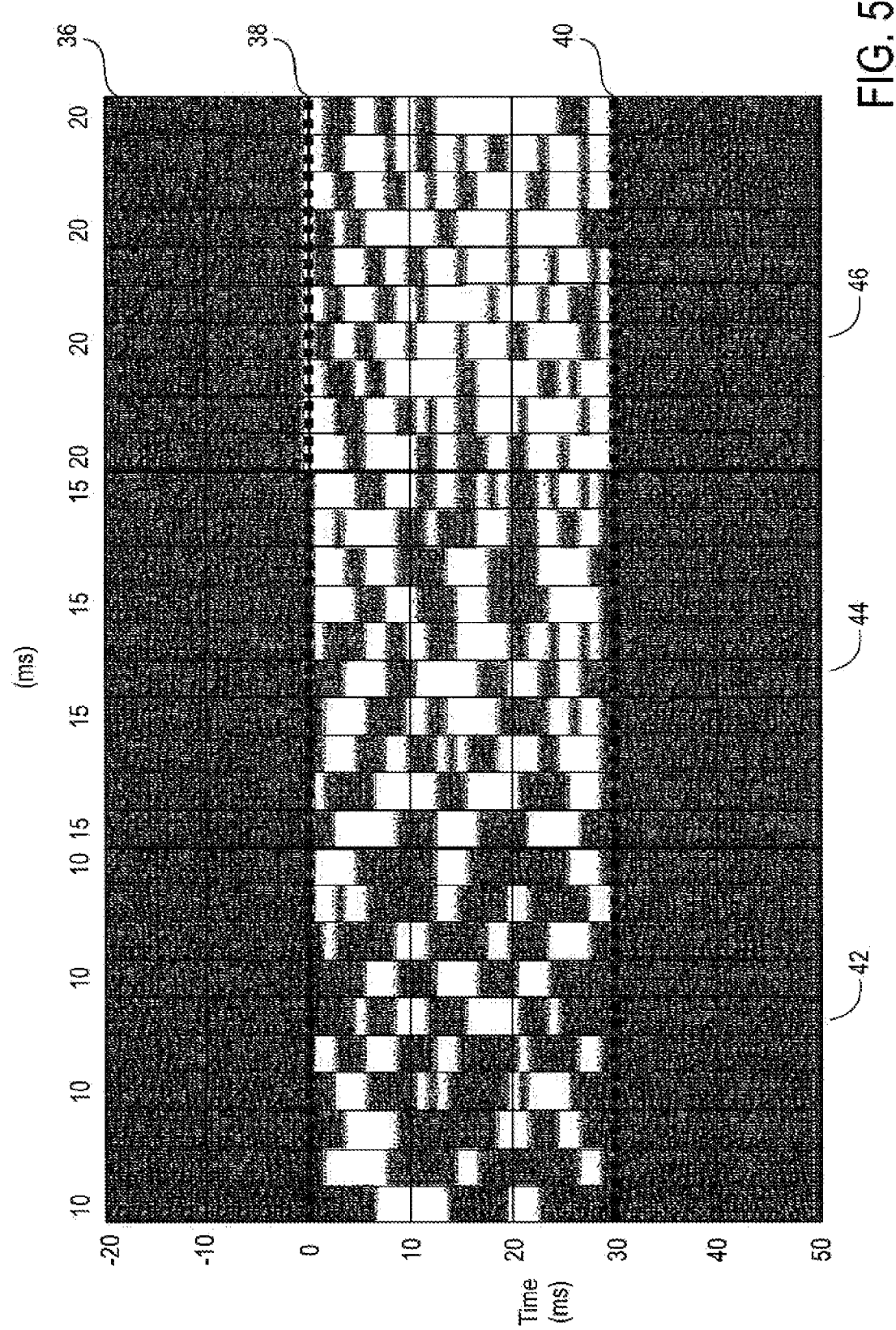
FIG. 5 is a schematic showing the lithology of examples of pseudo-wells for a gross sand interval of 30 ms and net-sand thicknesses of 10, 15, and 20 ms, respectively.

In order to illustrate one of the embodiments of the present invention, FIG. 5 depicts a series of thirty pseudo-wells 36 consisting of a target zone of 30 ms between two shale layers. Top 38 and base 40 of the target zone are marked by dotted lines. The target zone contains various amounts of sand shown in white. Specifically, the first 10 pseudo-wells contain sands with a total thickness of 10 ms 42 arranged in different configurations, the second 10 pseudo-wells contain sands with a total thickness of 15 ms 44, and the last 10 pseudo-wells have sands with a total thickness of 20 ms 46. To simplify matters the elastic properties of sands and shales were made constant. The averages were based on those typically found in wells. Thus the only reflections come from the shale/sand and sand/shale interfaces.

Referring to FIG. 6, the lower portion shows the synthetic seismic traces computed with a zero-phase 5-10-30-60 Hz Ormsby wavelet. The tuning thickness is about 14 ms. Thus, the gross sand thickness is above tuning. As can be seen in this figure the synthetic traces for the same net-sand thickness can be quite different. On the other hand, traces representing different net-sand thicknesses can be quite similar, though with different amplitudes. The dotted lines indicate the top 52 and the base 54 of the target zone. Dashed lines 48 and 50 mark the interval over which the probe function is applied. The upper portion of FIG. 6 shows the net-sand thickness predicted from each trace. Obviously, in spite of all variability of the underlying traces, the attribute represents the actual net-sand thickness correctly.

FIG. 7 is equivalent to FIG. 6, the essential difference is that the wavelet used here is minimum-phase. Hence the interval to which the probe function is applied is shifted with respect to the target zone. The dotted lines indicate the top 56 and the base 58 of the target zone. Dashed lines 60 and 62 mark the interval over which the probe function is applied. The upper portion of FIG. 6 shows the net-sand thickness predicted from each trace. This figure illustrates the result is independent of the wavelet phase.

Figure 8:
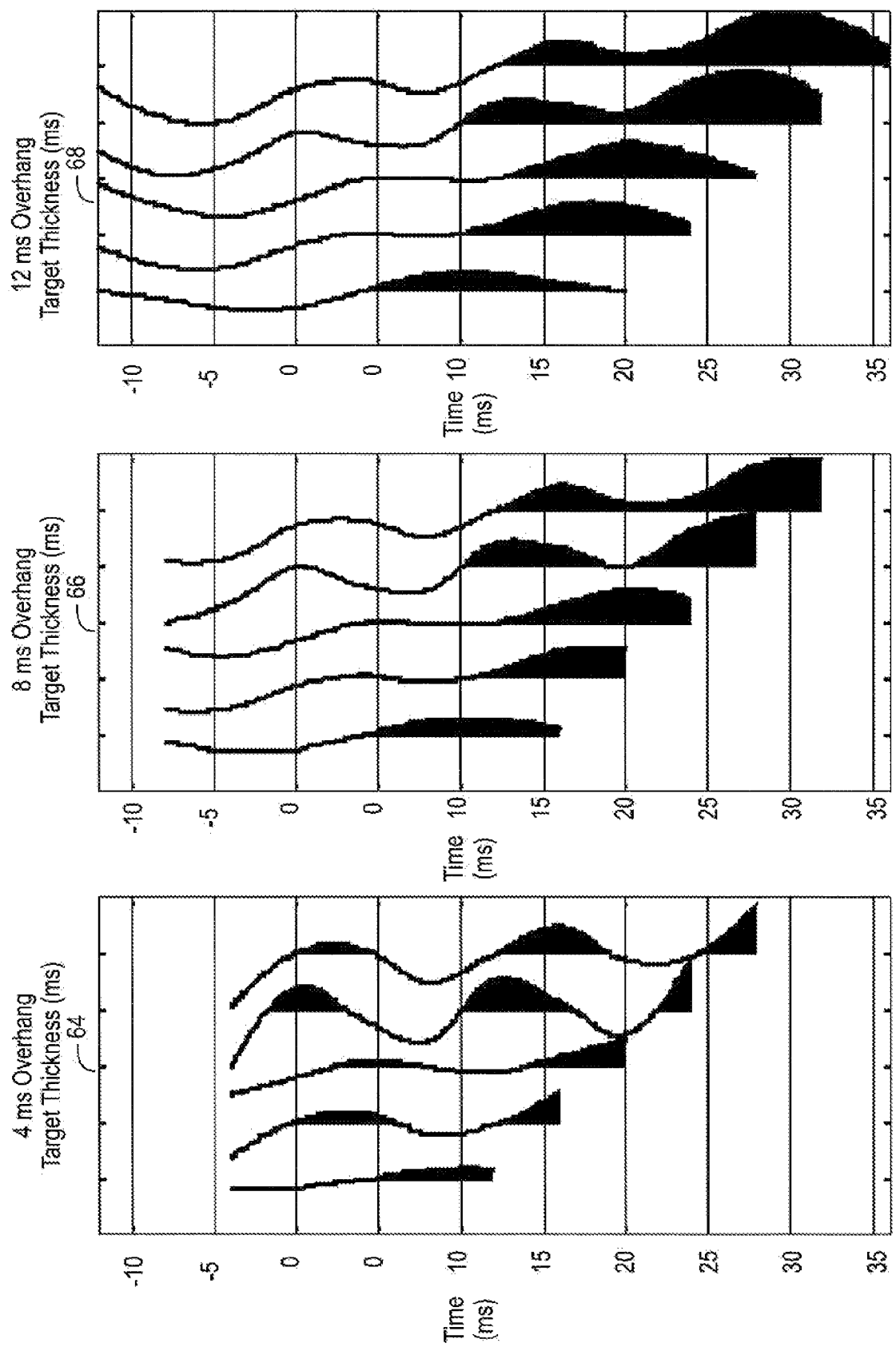
FIG. 8 is a schematic showing three sets of probe functions having differing target thicknesses and differing overhangs.

FIG. 8 shows three sets of probe functions 64, 66, 68. Each set consist of five functions for target thicknesses of 8, 12, 16, 20, and 24 ms. The difference between these three sets is the amount of overhang.

Embodiments of the present invention includes storing each seismic trace and the net-resource attribute together with the geographic location information. A table may be created to capture the geographical location information and the associated net-resource attribute. By way of example, and not limitation, the geographic location information may include in-line number and cross-line number and/or x and y coordinates of the common depth points. Of course, those skilled in the art will appreciate that other geographic location information can be captured with the net-resource attributes.

In some embodiments, the present invention may be implemented on a data management system capable of seismic interpretation. Maps and net-reservoir volume can be generated from the geographical location information and the net-resource attributes. Most preferably the maps and net-reservoir volumes can be generated from the above described attribute tables. However, the maps and net-reservoir volumes can also be computed directly as part of the attribute calculations.

Figure 9:
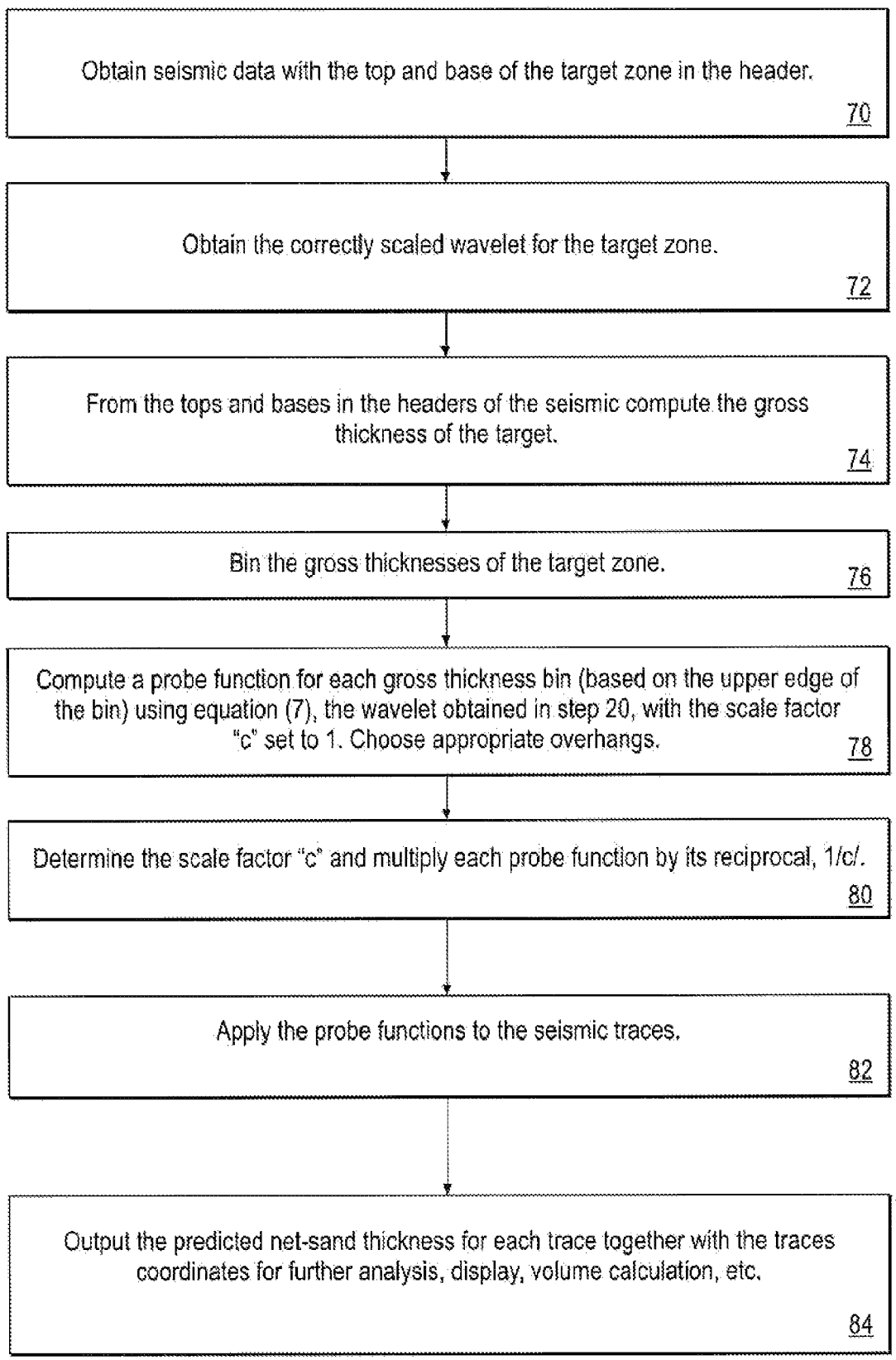
FIG. 9 is a flowchart describing the overall steps taken, in an embodiment of the present invention, for determining the net-sand thickness of a target zone.

FIG. 9 is a flowchart describing the overall steps taken, in one embodiment of the present invention, to directly determine the net-sand thickness of a target zone with actual data. Data is assumed to be supplied in the required format; if this is not the case, the data may need to be modified in a fairly obvious manner.

Seismic data with the top and base of the target zone in the header are obtained 70, and the correctly scaled wavelet for the target zone is obtained 72. From the tops and bases in the headers of the seismic the gross thicknesses of the target zone are computed 74. The gross thicknesses of the target zone are binned 76, and a probe function is computed for each gross thickness bin (based on the upper edge of the bin) using equation (7), the obtained wavelet with the scale factor "c" set to 1, and the appropriate overhangs are chosen 78. The scale factor "c" is determined and multiplied with each probe function 80. The probe functions are then applied to the seismic traces 82. This entails for each trace: selecting the appropriate probe function based on the gross thickness and forming the inner product of that probe function with the segment of the seismic trace bounded by times $T_1$ and $T_2$ where $T_1$ is the time of the top of the target-zone minus the top overhang and $T_2$ is the time of the base of the target zone plus the base overhang. The output is the predicted net-sand thickness for each seismic trace 84. The output can also include the geographic location information, such as the seismic trace coordinates 84, which may include but are not limited to the inline number and cross-line number or geographic longitude and latitude. Knowledge of the net-sand thickness as a function of location also allows one to determine the net-reservoir volume. In some embodiments the output may be used for further analysis, display, volume calculation, maps, simulation and modeling.

While in the foregoing specification this invention has been described in relation to certain embodiments thereof, and many details have been set forth for purpose of illustration, it will be apparent to those skilled in the art that the invention is susceptible to alteration and that certain other details described herein can vary considerably without departing from the basic principles of the invention.

What is claimed is:

1. A method for determining net-resource attributes associated with the net-sand thickness in a target zone, the method comprising:

obtaining a plurality of seismic traces from a seismic survey conducted over a subterranean region;

obtaining a top and a base of a target zone for each seismic trace;

determining a gross thickness for each seismic trace by subtracting the top from the base of the target zone;

determining a probe function associated with the gross thickness of each seismic trace in accordance with the following expression:

$$N = \int_0^T p_0(t) r(t) dt;$$

where $p_0(t) = c(t-T/2)$ for $0 \leq t \leq T$;
wherein the variables are defined as:
N is the net-sand thickness:
$p_0(t)$ is a probe function for the seismic trace r(t) when the wavelet is a spike;
T is the thickness of the target zone;
c is the reciprocal of the shale/sand reflection coefficient; and computing a net-resource attribute based upon the inner product of the determined probe function and the segment of the seismic trace that includes the target zone.

2. The method of claim 1 further comprising:
defining bins based upon the gross thicknesses derived from all of the seismic traces;
determining a probe function for each bin; and
assigning to the seismic trace a probe function based upon the bin into which the gross thickness for that seismic trace falls.

3. The method of claim 1 further comprising:
estimating a seismic wavelet for the target zone; and
computing the probe function based upon the seismic wavelet.

4. The method of claim 1 wherein, the application of the probe function is such that the projection of the seismic trace segment on to the probe function provides a net-resource attribute.

5. The method of claim 1 wherein, the net-resource attribute is the net-sand thickness of the target zone.

6. The method of claim 1 wherein, the probe function is computed for a seismic wavelet in accordance with the following expression:

$$\int_{T_1}^{T_2} \omega(\tau - t) p(\tau) d\tau = p_0(t);$$

wherein the variables are defined as:
w(t) is the seismic wavelet;
$p_0(t)$ is a zero-mean linear function of the variable t;
p(t) is the desired probe function; and
$T_1$ and $T_2$ denote the top and the base of the interval over which the probe function is to be applied.

7. The method of claim 1 wherein, the target zone comprises alternating layers of seals and reservoir rocks.

8. The method of claim 1 further comprising the step of computing a net-reservoir volume based upon the net-resource attribute.

9. The method of claim 1 further comprising:
storing the net-resource attribute together with the geographic location information.

10. The method of claim 1 further comprising:
creating a map based upon the net-resource attribute.

11. The method of claim 1 further comprising:
constructing a net-resource table comprising the net-resource attributes and the geographic location information.

12. The method of claim 11 further comprising:
creating a map based upon the net-resource table.

13. The method of claim 11 further comprising:
computing a net-reservoir volume from the net-resource table.

14. A method for determining net-resource attributes associated with the net-sand thickness in a target zone, the method comprising:

obtaining a plurality of seismic traces from a seismic survey conducted over a subterranean region;

obtaining a top and a base of a target zone for each seismic trace;

determining a gross thickness for each seismic trace by subtracting the top from the base of the target zone;

defining a plurality of bins based upon the gross thicknesses derived from the plurality of seismic traces;

determining a probe function for each bin;

computing the probe function for each bin in accordance with the following expression:

$$\int_{T_1}^{T_2} \omega(\tau - t) p(\tau) d\tau = p_0(t);$$

wherein the variables are defined as:
w(t) is the seismic wavelet;
$p_0(t)$ is a zero-mean linear function of the variable t;
p(t) is the desired probe function; and
$T_1$ and $T_2$ denote the top and the base of the interval over which the probe function is to be applied;

assigning to the seismic trace a probe function based upon the bin into which the gross thickness for that seismic trace is included;

computing a net-resource attribute based upon the inner product of the determined probe function and the segment of the seismic trace that includes the target zone; and storing the net-resource attribute together with the geographic location information;

wherein the net-resource attribute is the net-sand thickness of the target zone and the target zone comprises alternating layers of shales and reservoir rocks.

15. The method of claim 14 further comprising the step of:

constructing a net-resource table comprising the net-resource attributes and the geographic location information.

16. The method of claim 15 further comprising the step of:

creating a map based upon the net-resource table.

17. The method of claim 15 further comprising the step of:

computing a net-reservoir volume from the net-resource table.

* * * * *